US009179661B2

(12) United States Patent
Mahidhara

(10) Patent No.: US 9,179,661 B2
(45) Date of Patent: Nov. 10, 2015

(54) HORSESHOE WITH SPLAYING, AND STABILIZER FEATURE

(71) Applicant: Murali Mahidhara, Pittsburgh, PA (US)

(72) Inventor: Murali Mahidhara, Pittsburgh, PA (US)

( * ) Notice: Subject to any disclaimer, the term of this patent is extended or adjusted under 35 U.S.C. 154(b) by 0 days.

(21) Appl. No.: 14/121,176

(22) Filed: Aug. 8, 2014

(65) Prior Publication Data

US 2014/0374124 A1 Dec. 25, 2014

Related U.S. Application Data

(63) Continuation-in-part of application No. 13/261,128, filed on Jan. 9, 2012, now abandoned, and a continuation-in-part of application No. 13/385,172, filed on Feb. 4, 2012, now Pat. No. 8,881,838.

(51) Int. Cl.
*A01L 1/02* (2006.01)
*A01L 3/02* (2006.01)
*A01L 7/02* (2006.01)
*A01L 7/04* (2006.01)

(52) U.S. Cl.
CPC ... *A01L 3/02* (2013.01); *A01L 7/02* (2013.01); *A01L 7/04* (2013.01)

(58) Field of Classification Search
CPC ............... A01L 1/00; A01L 3/02; A01L 1/02; A01L 7/02; A01L 7/06
USPC .............................................. 168/4, 6, 7, 8, 9
IPC ...................... A01L 1/00, 3/02, 1/02, 7/02, 7/06
See application file for complete search history.

(56) References Cited

U.S. PATENT DOCUMENTS

| | | | | |
|---|---|---|---|---|
| 766,039 A * | 7/1904 | Hoffman | | 168/28 |
| 1,035,969 A * | 8/1912 | Kiefer | | 168/29 |
| 2,622,685 A | 12/1952 | Dixon | | |
| 3,548,947 A * | 12/1970 | Mackay-Smith | | 168/29 |
| 4,480,698 A * | 11/1984 | Reeves | | 168/4 |
| 4,993,494 A * | 2/1991 | Tuunanen | | 168/4 |
| 5,158,143 A * | 10/1992 | Campbell | | 168/4 |
| 6,263,973 B1 | 7/2001 | Bergeleen | | |
| 2005/0236165 A1 * | 10/2005 | Yates et al. | | 168/4 |

* cited by examiner

*Primary Examiner* — Lisa Tsang
(74) *Attorney, Agent, or Firm* — Rama B Nath

(57) ABSTRACT

A horseshoe with a stabilizer-feature and splaying has a U shaped metallic unitary body with left-right wings and an integral compliant leaf-spring disposed proximate to or in the horseshoe toe area. The leaf-spring may be crescent-shaped or chord-shaped and resiliently deforms upwards, exerting sideways-pressure causing splaying of the left-right wings. The leaf-spring may have a groove on either side to assist preparation before horseshoe installation. The crescent-shaped leaf-spring forms a cavity with the hoof underside in use, which cavity is optionally filled with a resilient material, e.g., silicone, obviating accumulation of dirt/debris. Stabilizers comprising a plurality of rows of beads formed integrally with the horseshoe bottom form a negative camber on the horseshoe-underside. The stabilizer rows may be staggered and assist in the stability of the horse during racing, especially at track-curves. The horseshoe may be cast/forged, blanked, or welded and can be mass-produced. Preferably, the horseshoe comprises hardened spring steel.

16 Claims, 6 Drawing Sheets

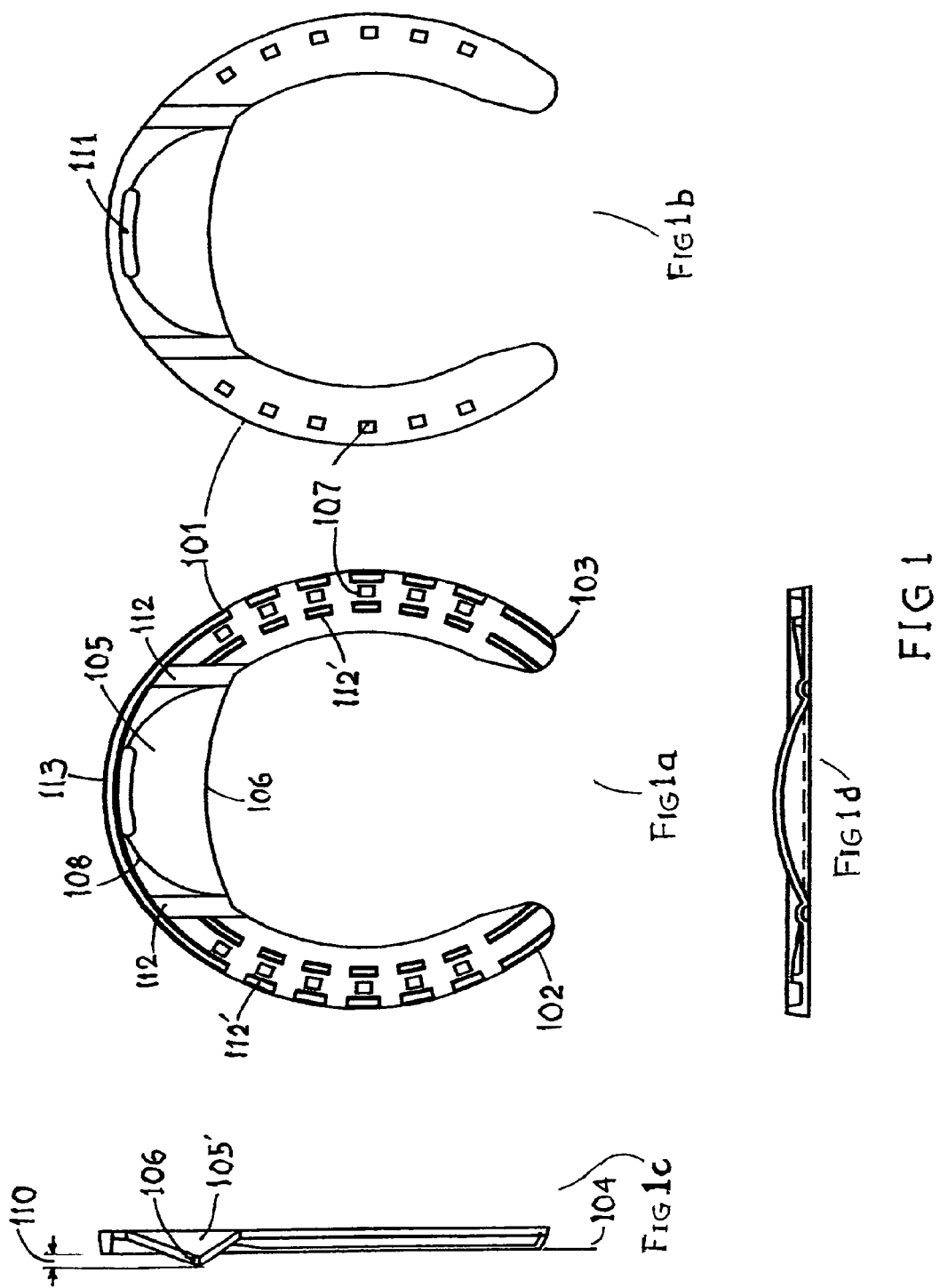

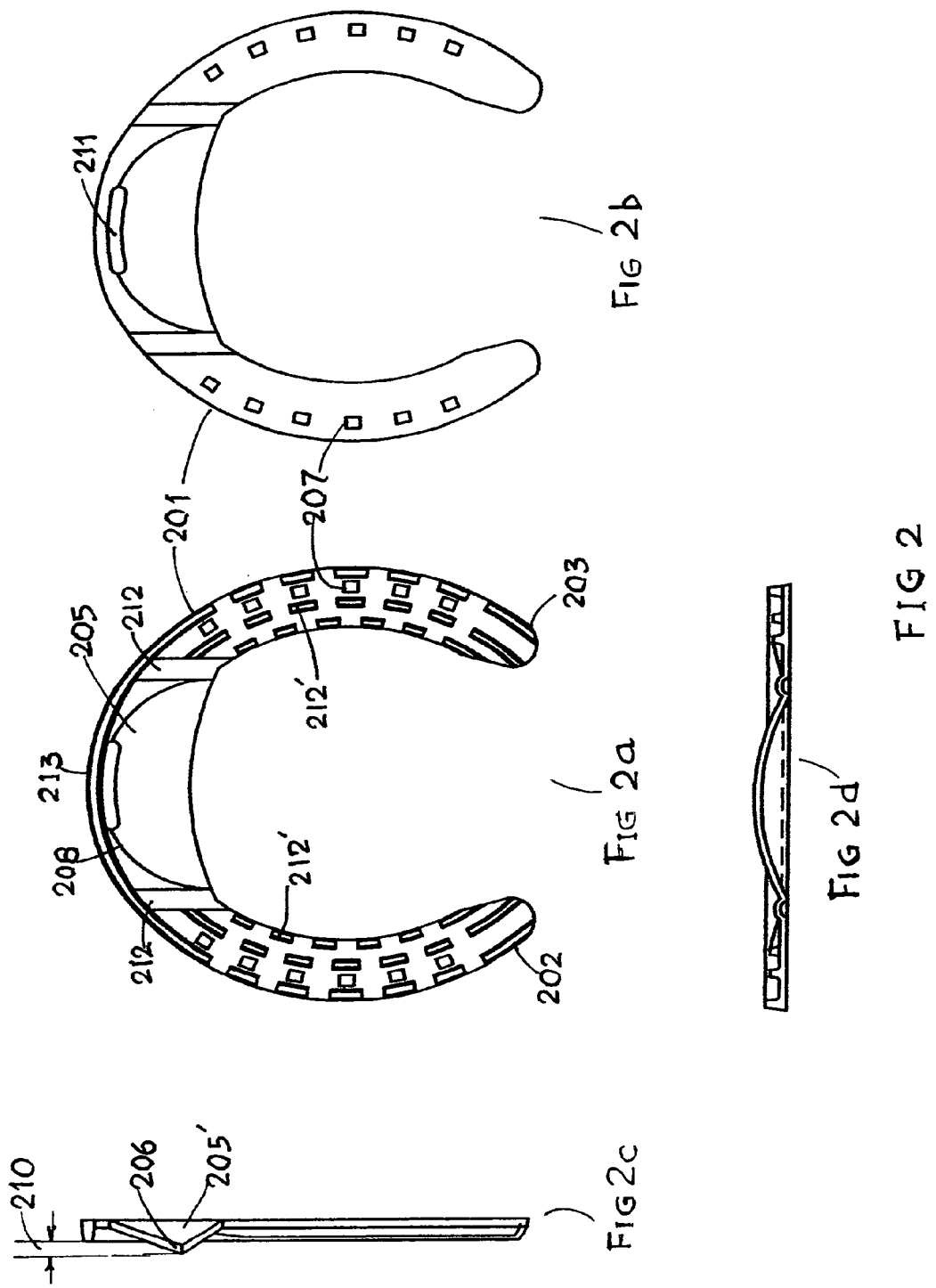

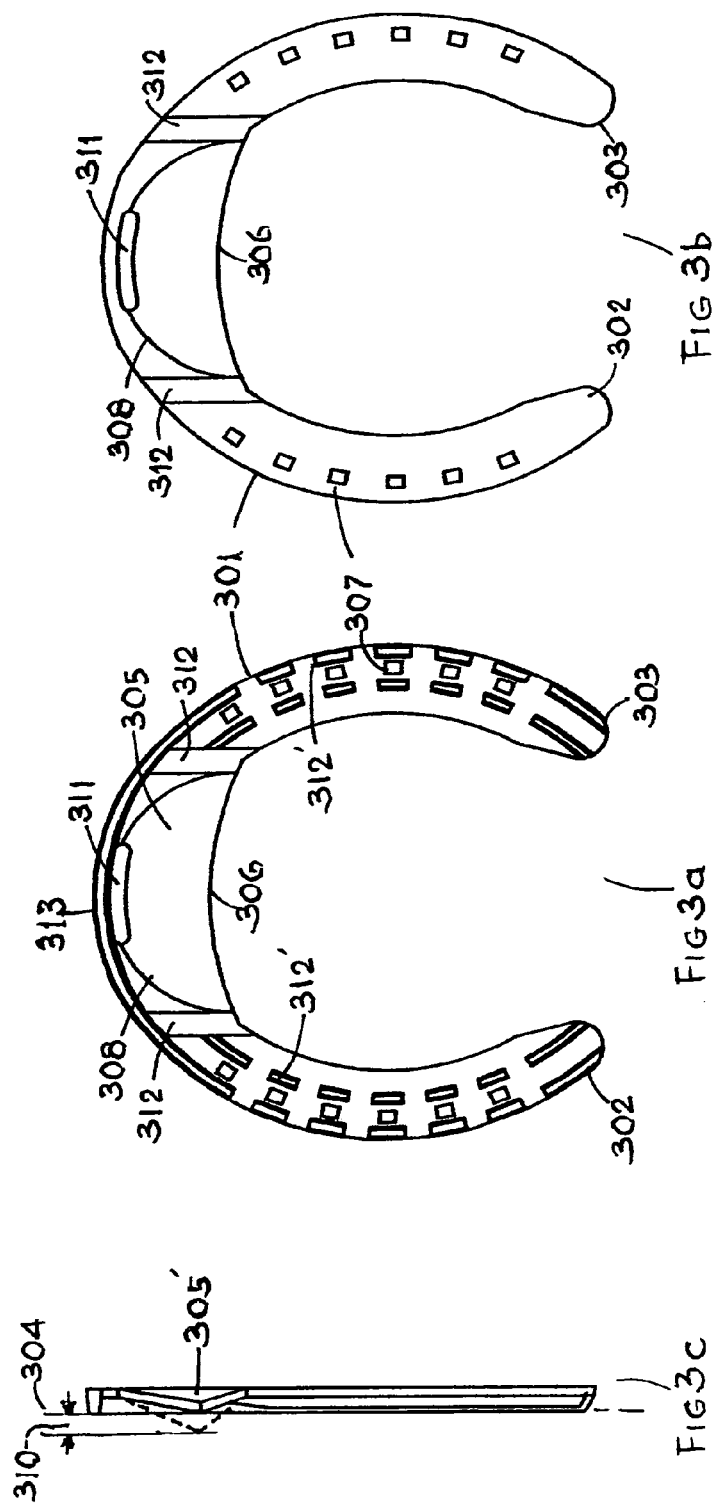

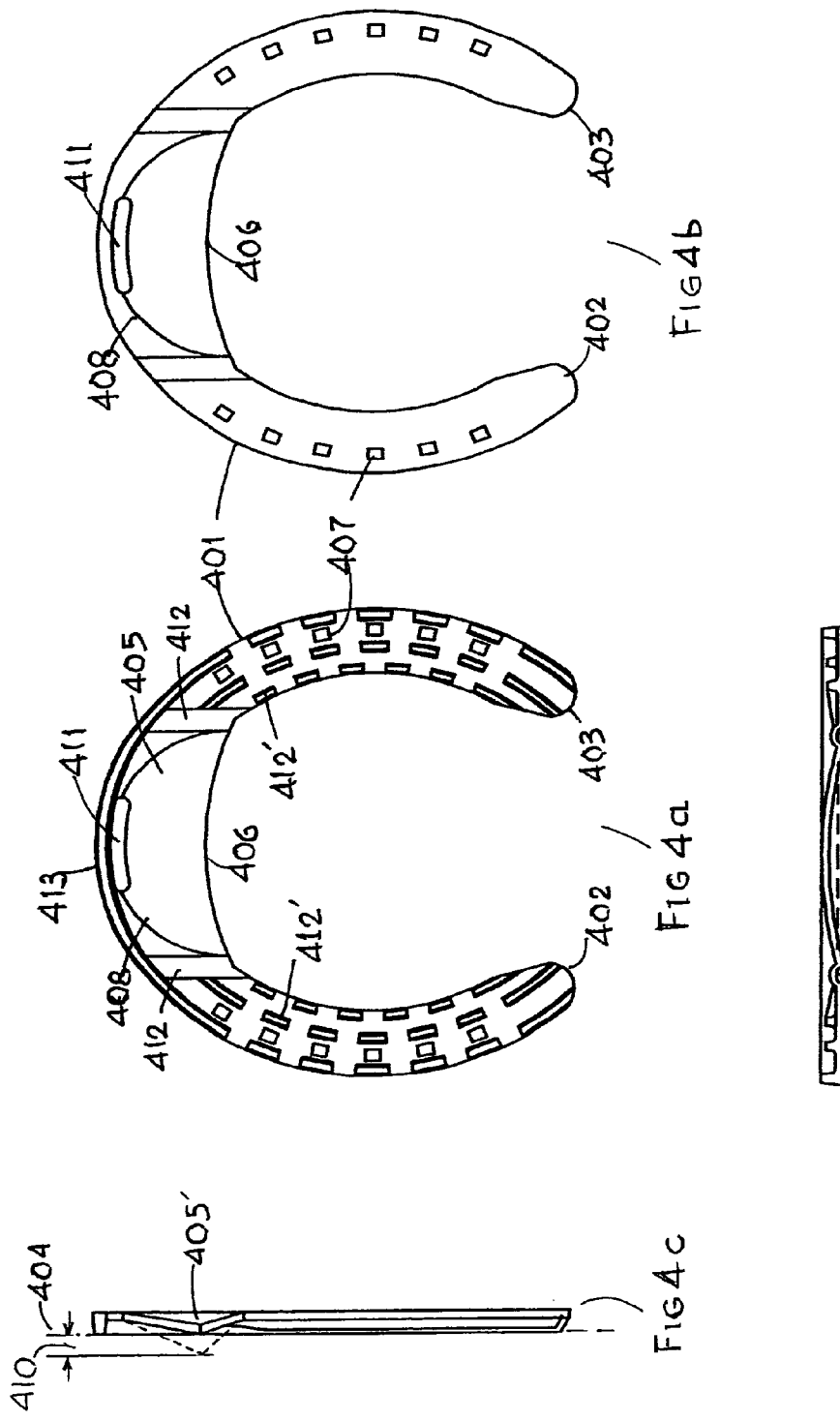

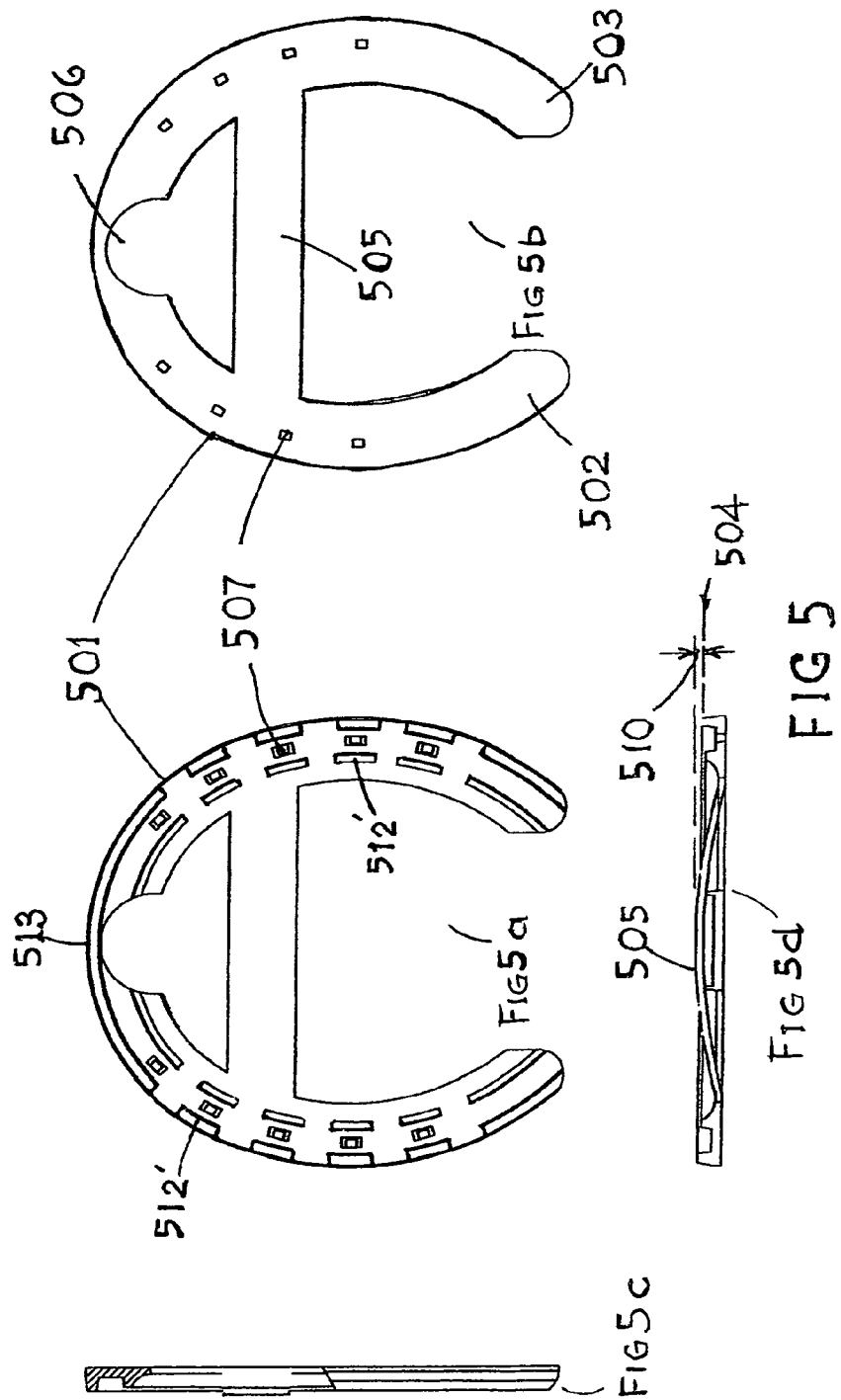

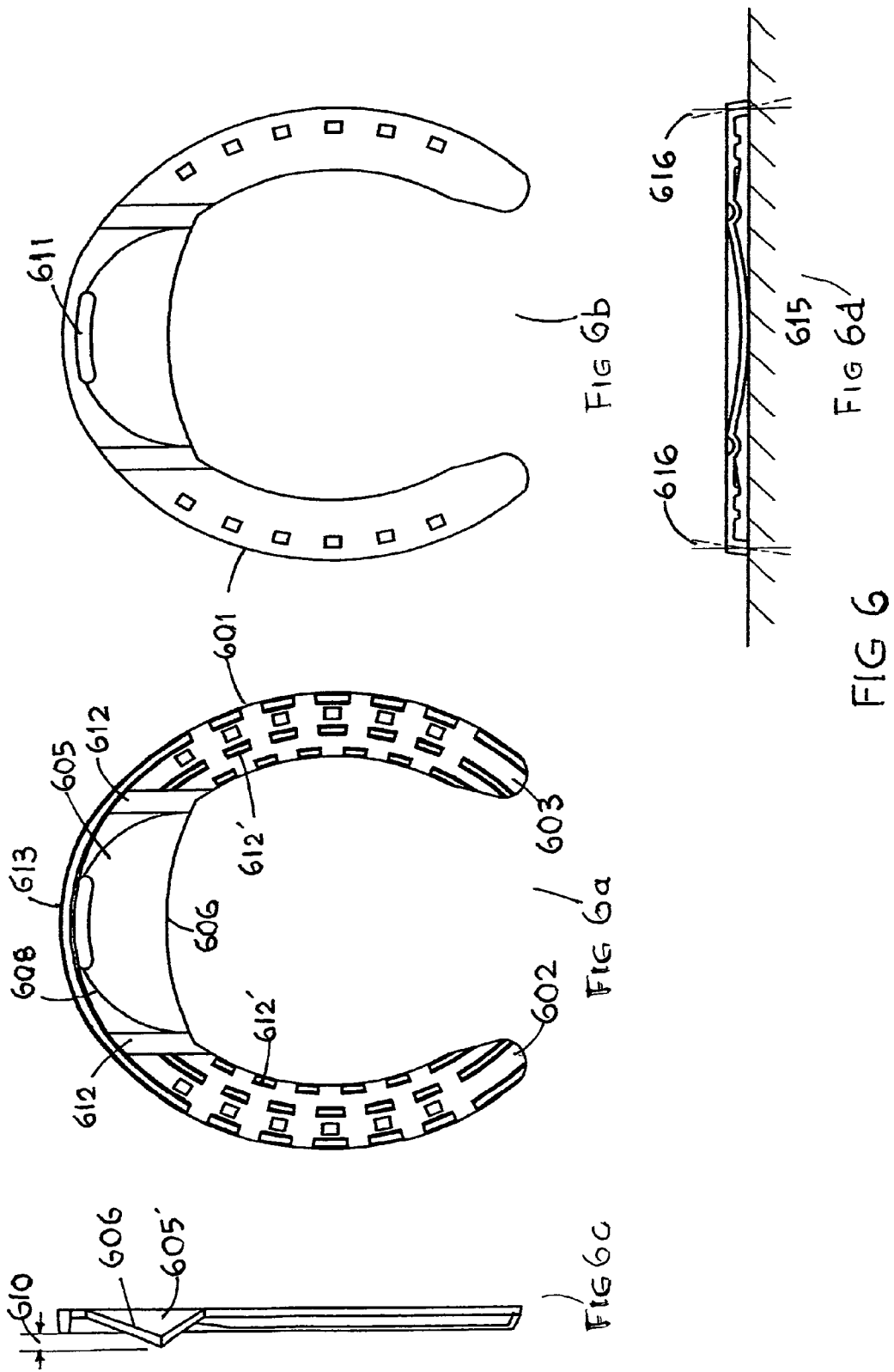

HORSESHOE WITH SPLAYING, AND STABILIZER FEATURE

RELATED APPLICATIONS

This application is a Continuation in Part of earlier U.S. application Ser. No. 13/385,172 (now U.S. Pat. No. 8,881,838 B2) which in turn is a Continuation in Part of U.S. Ser. No. 13/261,128 which has a filing date of Jan. 9, 2012, the contents of which are incorporated herein by reference. This application also claims the benefit of priority from U.S. Provisional Application No. 61/962,399, filed Nov. 6, 2013, the contents of which are also incorporated herein by reference.

FIELD OF THE INVENTION

The present invention is generally directed to a horseshoe, and more particularly to a race-horseshoe which is relatively inexpensive with unitary construction and provides a splaying feature. Additionally, the present invention includes a stabilizer feature at the underside surface of the horseshoe to facilitate especially race horses while they negotiate curves/bends on a track.

BACKGROUND OF THE INVENTION

It has been the object of many horseshoe designers and farriers to provide a horseshoe which is hoof-friendly and which mimics to some extent the movement of a horse's hoof when the horse is walking or running, especially on a hard surface. Various attempts have been made over decades to obviate the rigidity of conventional metallic horseshoes by introducing nonmetallic or composite elements that provide selected degrees of flexibility and resilience. It is desirable to provide a simple unitary, somewhat flexible construction for the horseshoe, and it also desirable to provide a horseshoe with an advantageous stabilizing feature, especially for race horseshoes.

It has however been found that the prior art horseshoe designs which provide resilience invariably have a composite construction, or use several parts and components, and do not offer simplicity, reliability or cost effectiveness. Those prior art horseshoes which by design use predominantly resilient material, are generally less durable (-shorter life-) than the conventional rigid metallic designs which might however restrict hoof-expansion and thus create increased stress in the hoof and legs of the horse, particularly during racing.

Despite the availability of horseshoe designs providing shock absorption, flexibility and such features, there is still a need for a horseshoe design which is characterized by simplicity, economy, controlled-splaying and including a stabilizing feature to assist race horses when they negotiate curves on a race track.

SUMMARY OF THE INVENTION

The present invention intends to obviate complexity and certain less desirable aspects of prior art horseshoe design, and provides a relatively less expensive and very simple unitary design that aims at causing and allowing the much desired splaying of the horseshoe particularly during racing. The present invention also aims at providing structural stabilizing features in the horseshoe to improve stability for race-horses while negotiating curves on race tracks.

The present invention provides a simple and economical horseshoe design, unitary in construction and preferably of metallic material. Additionally in the present invention, the underside surface of the horseshoe may include a stabilizer feature that is configured to provide a predetermined negative camber with respect to the shoe undersurface, to increase stability while a race-horse negotiates curves on a race-track.

One embodiment of the invention in its broad form resides in a horseshoe which when in use is capable of causing and accommodating splaying of a horse hoof, said horseshoe comprising a generally U shaped unitary single piece solid metal body including a heel-region and including left and right branches having metallic undersurfaces lying on a common bottom plane of the horseshoe, and a central toe area, said central toe area including a crescent shaped spring element that includes a convex outer edge and a concave inner edge, said spring element having resilience in a vertically upward direction that is perpendicular to said common bottom plane, said convex outer edge being substantially in said common bottom plane, said concave inner edge in use projecting below said common bottom plane by a projection-portion having a chosen design dimension which upon the horseshoe in use impacting ground, gets resiliently pushed vertically upwards to deliberately and mechanically cause and allow said left and right branches of the horseshoe to splay, the left and right branches including stabilizer means comprising rows of bead-like formations on the horseshoe underside, whereby, when said central toe area is not impacting the ground, said left and right branches of the horseshoe tend to be repetitively and resiliently restored to their original positions without splaying. The crescent shaped spring element forms a cavity with the underside of the horse hoof in use, which cavity may be filled with a compressible material to obviate accumulation of debris. There may be two/three rows of bead-like formations or projections comprising the stabilizer means. The bead-like formations may have their tips lying on a surface that shows a negative camber so as to enhance the road grip caused by the bead-like formations.

A second embodiment comprises a generally U shaped compliant unitary single-piece solid metal horseshoe having left and right wings which lie in a common bottom plane and having a toe area integral with said left and right wings, said metal horseshoe including a compliant spring element integral with and bridging said left and right wings and having vertically upward resilience and acting as a leaf-spring, said leaf-spring in use having a projection of a chosen design dimension formed substantially perpendicular to and projecting below said common bottom plane, said leaf-spring having a first unstressed state and a second resiliently stressed state, said leaf-spring attaining its said second stressed state upon loading of the horseshoe in use by ground impact to push said projection resiliently upwards, said leaf-spring in its second stressed state exerting resilient horizontal pressure sideways on said left and right wings so as to deliberately cause mechanical splaying of said left and right wings as desired, said leaf-spring tending to be repetitively restored to its first unstressed state when the horseshoe in use is not loaded or not impacting ground, whereupon said left and right wings are restored to their positions prior to splaying, said metal horseshoe additionally including stabilizer means comprising a plurality of rows of bead-like elements integrally formed on an undersurface of said metal horseshoe to provide additional road grip while the inventive horseshoe is being used on a race track. The rows of bead-like elements may comprise projections that are staggered.

A third embodiment resides in a horseshoe capable of causing and accommodating splaying of a horse hoof in use, said horseshoe comprising a generally U shaped unitary single-piece solid metal body and including left and right branches lying on a bottom plane of the horseshoe, and a central toe portion integrally bridging the left and right branches which are capable of resilient splaying, said central toe portion including a generally crescent shaped integral leaf-spring with a first unstressed state and a second stressed state, said crescent shaped leaf-spring having a convex edge and a concave edge, the concave edge having a projecting-portion equal to a chosen design dimension and projecting below said bottom plane in said first unstressed state, said generally crescent shaped leaf-spring attaining its said second stressed state by loading of the horseshoe when the horseshoe in use impacts ground, said projecting-portion of the leaf-spring being resiliently pushed upwards to reach its said second stressed state to deliberately cause said left and right branches to splay as desired, whereby the crescent shaped leaf-spring continually and alternately goes through its said second stressed and said first unstressed states repetitively when the horse hoof in use impacts ground and is off ground, the metal horseshoe additionally comprising stabilizer means in the form of a plurality of rows of bead-like elements integrally formed on the horseshoe bottom surface to provide additional road grip for the horseshoe in use while on a race track.

Expediently, the projection-portion referred to supra may be re-formed and become defined in use when a father prepares the inventive horseshoe for installation. It is noted that the crescent shape of the toe area while the horseshoe is in use, forms a cavity which may be filled with a resilient compressible material with intent to prevent accumulation of dirt and debris in the cavity. The horseshoe as aforesaid includes a stabilizer feature provided at the underside of the horseshoe, the stabilizing feature being preferably configured to provide a negative camber with respect to the shoe undersurface, to improve traction while the horse negotiates curves on a race-track.

Advantageously, the horseshoe of the present invention is unitary and non-composite in construction, thereby keeping the construction simple and the cost down. A variation uses a chord-like leaf-spring member bridging the left and right wings of the horseshoe instead of the crescent shaped leaf-spring at the central toe area. In such a variation too, the undersurface of the horseshoe is provided with a stabilizer feature. The stabilizer feature may comprise rows of beads formed integrally on the underside of the horseshoe to facilitate the horse to negotiate curves on a race-track. Advantageously, the rows of beads may be configured to form a negative camber with respect to the horseshoe undersurface.

Expediently, the horseshoe referred to in any of the previous paragraphs could include a groove on either side of the spring element. Said grooves serve to separate the crescent shaped toe area from the left and right wings, and assist in bending the left and right wings as necessary by the farrier during farrier-preparation and sizing of the horseshoe. The grooves may have a cross-sectional profile such as a V shaped profile, or alternatively semi-circular or semi-elliptical profiles, depending on the design choice. Preferably, the stabilizer feature could comprise two or three rows of beads or the like formed integrally with the horseshoe on the underside surface of the horseshoe. In the three-stabilizer rows version, the innermost row may be offset from the other rows. Other modifications comprising the stabilizer feature are conceivable and are within the ambit of the invention. The stabilizer feature, as aforesaid is intended to enhance the stability of the horse especially during racing and while negotiating curves in the race-track.

Preferably, the grooves referred to supra may have a profile chosen from semi-circular, semi-elliptical, arcuate and V-shaped profiles.

BRIEF DESCRIPTION OF THE DRAWING

A more detailed understanding of the invention may be had from the following description of preferred embodiments which are exemplary and not intended to be limiting, and to be understood in conjunction with the accompanying drawings wherein:

FIGS. 1a-1d illustrate a first embodiment of the invention with a spring projection and a stabilizer element comprising two rows of stabilizer ridges;

FIGS. 2a-2d illustrate a second embodiment of the invention with a spring projection and a stabilizer element comprising three rows of stabilizer ridges;

FIGS. 3a-3d illustrate an embodiment without a spring projection initially at manufacture, and a stabilizer element comprising two rows of stabilizer beads/ridges;

FIGS. 4a-4d illustrate an embodiment without a spring projection initially at manufacture, and a stabilizer element comprising three rows of stabilizer ridges, and FIGS. 5a-5d illustrate an embodiment showing a chord-like spring member and a stabilizer element comprising two rows of stabilizer beads/ridges.

FIGS. 6a-6d illustrate an embodiment showing the stabilizing feature in the form of a plurality of beads at the bottom plane of the horseshoe, the stabilizer feature being configured to provide a negative camber with respect to the shoe undersurface, while the horse negotiates curves on a race-track.

DETAILED DESCRIPTION OF EMBODIMENTS

A detailed description of one or more embodiments of the invention is provided below in the context of the accompanying figures that illustrate by way of example the principles of the invention. While the invention is described in connection with such embodiments, it should be understood that the invention is not limited to any particular embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention The present invention may be practiced according to the claims without some or all of these specific details. For the purpose of clarity, technical material that is known in the technical fields related to the invention has not been described in detail so that the present invention is not unnecessarily obscured.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made. The embodiments included herein are described in sufficient detail to enable those skilled in the art to practice the invention, and it is to be understood that other embodiments may be utilized including changes that may be made without departing from the scope of the present invention. The description herein is by way of example only, and is therefore not to be taken in a limiting sense, and the scope of the present invention is defined only by the claims and their equivalents.

Described hereinafter are embodiments of a unitary non-composite horseshoe which is preferably metallic and having a configuration including a stabilizer feature on the underside of the horseshoe, wherein the stabilizer feature serves to minimize lateral shift of the horseshoe during racing.

FIGS. 1a-1d generally show an exemplary diagrammatic illustration of the first embodiment of the inventive horseshoe. As shown, the horseshoe includes a generally U shaped body 101 including left and right branches 102, 103 which have an undersurface lying on a common bottom plane 104. The left and right branches 102 and 103 are bridged by a toe area 113 including a crescent shaped spring element 105 functioning like a leaf-spring, which includes a concave inner edge 106 and a convex outer edge 108. The crescent shaped spring element 105 has resilience in the vertically upward direction so as to consequently deform in the horizontal direction to cause splaying of the branches 102 and 103. The concave inner edge 106 includes portions which project below the common bottom plane 104 by a projection-portion 110. When the horseshoe is loaded (such as when the horse is standing or when the hoof impact the ground during running) the central convex formation of the leaf-spring in the toe area 105 gets into its loaded state or stressed state whereupon the leaf-spring 105 tends to be resiliently pushed upwards thereby enabling the left and right branches to resiliently and deliberately splay as desired. In the unstressed state of the toe area 105, the splay is absent or is reversed. Thus, the spring element 105 alternately and successively goes through its stressed and unstressed states when the horse hoof touches/impacts ground and is off ground respectively. It is further noted that the crescent shaped spring element 105 creates a space or cavity between the projection-portion explained above and the underside of the horse hoof in use. Expediently, the space or cavity may be filled with a compressible (resilient) material filler 105' e.g., silicone or a suitable grade of compressible resin which when retained in place can prevent undesirable accumulation of pebbles/dirt or other hard material which might impede the spring element 105 from functioning as intended; accumulation and retention of dirt in use might also cause discomfort to the hoof and is undesirable. Other suitable fillers in lieu of the silicone material are within the purview of the present invention. The silicone material/resin may be placed in the space/cavity either at the time the horseshoe is manufactured or by the farriers during the installation of the horseshoe. It is envisaged that the resilience of the silicone foam material will not impede resilient upward deformation of the spring element/leaf-spring as explained above, but permits splaying of the left and right branches of the horseshoe. As shown, the horseshoe includes a stabilizing feature on the horizontal plane, comprising two rows of ridges or beads 112'. The stabilizer feature is intended to stabilize the motion of the horse, especially while negotiating curves on a racetrack. Other configurations of the stabilizer are conceivable and are within the ambit of the invention. The inventive horseshoe is fastened/installed into position on the hoof by nails driven in the nail holes 107. Other fastening methods in lieu of nails may be used instead, as intelligible to those skilled in the art.

Optionally, the first embodiment may have the following features:

The convex outer edge in the first embodiment may have its ends substantially in level with the common bottom plane, and the projection-portion is at its maximum at substantially a center region of the concave inner edge. The projection-portion 110 during its resilient deformation determines the magnitude of splay of the left and right branches. The central toe area of the horseshoe may be integral with the left and right branches 102 and 103, or may be joined to the left and right branches by welding, brazing, or other similar methods of mechanical joining, as at grooves 112. Alternatively, the entire horseshoe may be obtained by forging or casting, or a combination of casting and forging, or by welding.

The horseshoe might comprise an alloy material such as for example hardened spring steel 17-4 PH or any other suitable grade, e.g., cast/forged spring steel alloy, or nonferrous material such as for example, titanium. The central toe area of the horseshoe may be obtained by a separate forging operation. Alternatively, the central toe area, and left and right branches may all be cast together (with optional forging followed) from material chosen from a group comprising titanium, spring steel alloy and any desired grade of spring steel, e.g., heat-treated spring steel, or hardened spring steel 17-4 PH.

As a variation, the central toe area of the horseshoe might include an elongated recess 111 adjacent the convex outer edge 108. Preferably, the central toe area is devoid of nail-holes 107 which may be generally limited to the left and right branches of the horseshoe.

FIGS. 2a-2d illustrate an embodiment similar in construction to that illustrated in FIGS. 1a-1d, except that the stabilizing feature comprises three rows 212' of ridges or beads. As shown, the inventive horseshoe includes a solid generally U shaped unitary body 201, left and right wing portions 202 and 203 on a horizontal plane, crescent shaped spring element 205 having a projection portion 210 projecting downwards of the horizontal plane, and concave inner edge 206. The spring element has resilience in the vertically upward direction. The exemplary embodiment shown in FIGS. 2a-2d includes an arcuate recess 211 in the toe region, and features nail holes 207 for fastening. As in the case of the example in FIGS. 1a-1d, the crescent shaped spring element 205 in use forms a cavity with the underside of the horse hoof, which cavity is preferably filled with a suitable compressible material 205' to obviate accumulation of dirt/debris in the cavity. Also as shown, this embodiment includes grooves 212 on either side of the spring element 205. As in the embodiment of FIGS. 1a-1d, upon vertical loading of the horseshoe, the projection portion 210 gets resiliently pushed vertically upwards to cause the spring element 205 to deform vertically upwards and thus forcibly/deliberately cause the left and right wing portions to mechanically splay. It is noted that the spring element 205 has resilience also in the horizontal plane and thus accommodates the intrinsic hoof splay induced by the horse per se. The three rows of beads 212' assist to stabilize the horse when it negotiates curves on a race track.

FIGS. 3a-3d generally illustrate yet another embodiment where notably the concave inner edge 306 of the spring element 305 in the toe area is initially substantially in the level of the bottom plane 304. Notwithstanding, it is noted that in use, the concave inner edge 306 gets pushed below the bottom plane to form and define the required projection-portion 310 when the farrier during installation-preparation pounds the horseshoe in order to do the sizing. In other words, the projection-portion 310 is permanently defined in use, by the farrier. The parts illustrated in FIGS. 3a-3d include a generally U shaped body 301, left and right branches 302 and 303, the spring element 305, concave inner edge 306 of the toe area, convex outer edge 308 of the toe area, filler material 305', and the projection-portion 310. Further illustrated are grooves 312 disposed one on each side of the central toe portion. The FIGS. 3a-3d illustration shows a stabilizing feature on the horseshoe underside-plane 304, comprising two rows of ridges or beads 312' formed integrally with the body of the horseshoe. Also, as shown the construction includes two grooves 312. The grooves 312 may generally have a cross section with a V shaped profile, and extend generally in the direction towards the heel of the horseshoe, but it is noted that slight variations in the orientation direction of the grooves are within the ambit of the invention. The profile of the groove may alternatively be chosen from a group comprising semi-circular, semi-elliptical, square and rectangular profiles, depending on the choice of the designer. Optionally, as in the embodiment of FIG. 1, an elongated recess 311 may be provided at the front of the toe area.

FIGS. 4a-4d illustrate an embodiment largely similar to the one in FIGS. 3a-3d except that the stabilizer comprises three rows of ridges or beads 412' formed integrally with the body of the horseshoe and provided at the shoe underside 404. The FIGS. 4a-4d illustration shows concave inner edge 406 of the spring element 405 in the toe area as being initially substantially in the level of the bottom plane 404. Notwithstanding, it is noted that in use, the concave inner edge 406 gets pushed below the bottom plane to form and define the required projection-portion 410 when the farrier during installation-preparation pounds the horseshoe in order to do the sizing. In other words, the projection-portion 410 is permanently defined in use, by the farrier. The parts illustrated in FIGS. 4a-4d include a generally U shaped body 401, left and right branches 402 and 403, the spring element 405, concave inner edge 406 of the toe area, convex outer edge 408 of the toe area, filler material 405', and the projection-portion 410. The FIGS. 4a-4d illustration shows a stabilizing feature on the horseshoe underside-plane 304, comprising three rows of ridges or beads 412' formed integrally with the body of the horseshoe. Further illustrated are grooves 412 disposed one on each side of the central toe portion. The grooves 412 may generally have a cross section with a V shaped profile, and extend generally in the direction towards the heel of the horseshoe, but it is noted that slight variations in the orientation direction of the grooves are within the ambit of the invention. The profile of the groove may alternatively be chosen from a group comprising semi-circular, semi-elliptical, square and rectangular profiles, depending on the choice of the designer. Optionally, as in the embodiment of FIGS. 1a-1d, an elongated recess 411 may be provided at the front of the toe area.

In another embodiment as illustrated in FIGS. 5a-5d, the invention provides a generally U shaped compliant horseshoe having left and right wings and a central toe area integral with the left and right wings and including an optional open recess facing the left and right wings, the horseshoe including a compliant chord-like leaf-spring disposed proximate to the central toe area, but not at the central toe area, and attachedly bridging said left and right wings. An example of the second embodiment may be seen in FIGS. 5a-5d. As shown, this embodiment includes a generally U shaped body 501, including left and right wings 502 and 503 lying on a common undersurface plane 504. A compliant leaf-spring 505 which is chord-like and preferably integral with the body 501 bridges the left and right wings and resiliently bows in its normal unstressed state below the undersurface plane 504 by a projection-dimension 510. Advantageously, the horseshoe may be made integral with the leaf-spring 505 which is disposed adjacent to or proximate to the central toe area where an open recess 506 is located. The leaf-spring 505 has a first (normal) unstressed state and a second stressed state, the leaf-spring attaining its second stressed state upon loading/impacting of the horseshoe in use by ground-impact/contact. It is also envisaged that the horseshoe of this embodiment may initially be manufactured without the projection-dimension 510, (i.e., initially, the chord-like leaf-spring may be made to be substantially in the same plane as the left and right wings,) so long as the projection-dimension 510 can be subsequently formed and set during farrier-preparation of the horseshoe during sizing of the horseshoe before installation. In any case, the projection-dimension 510 is desirable for the horseshoe to function as intended. In its second stressed state, the leaf-spring 505 is resiliently deformed vertically upwards of the undersurface plane 504, thus exerting horizontal pressure sideways on the left and right wings so as to deliberately cause the left and right wings to resiliently splay as desired. The leaf-spring can be restored to its first unstressed state reversing or undoing the splay when the horseshoe in use is not loaded or is not touching ground in use. Thus, each time the horseshoe impacts the ground, or each time when the horseshoe is loaded by the horse simply putting its weight on the horseshoe, the leaf-spring gets into its second stressed state and mechanically and deliberately causes the left and right wings 502 and 503 to splay resiliently. In all the embodiments described herein, the cyclic splay and the lack of splay of the horseshoe conform to the natural hoof-loading, thus assisting the horse especially on a race track. The provision of the open recess 506 assists the splay-response of the left and right wings 502 and 503. Nail holes 507 enable fastening of the horseshoe to the hoof. Alternative methods of fastening the horseshoe to the hoof are within the ambit of this invention, and will be intelligible to those skilled in the art. Additionally, the embodiment of FIGS. 5a-5d includes a stabilizer feature comprising two rows of ridges or beads formed integrally with the body of the horseshoe and provided on the underside of the shoe. The stabilizer feature, as aforesaid in the context of the other embodiments, improves the stability of the horse especially during racing while negotiating curves on a track. The number of rows of ridges/beads in the stabilizer may not be limited to two.

FIGS. 6a-6d generally illustrate a horseshoe embodiment including a stabilizer feature provided on the underside of the shoe comprising three rows of projections/beads or the like, wherein the beads are formed integrally with the body of the horseshoe. FIGS. 6a-6d is largely similar to the embodiment illustrated in FIGS. 2a-2d. The parts illustrated in FIGS. 6a-6d include a generally U shaped body 601, left and right branches 602 and 603, the spring element 605, concave inner edge 606 of the toe area, grooves 612, convex outer edge 608 of the toe area, filler material 605', and the projection-portion 610. However, FIGS. 6a-6d shows the loaded horseshoe in use contacting the ground 615. Expediently, the beads 612' comprising the stabilizer are configured to form a negative camber with respect to the bottom plane of the horseshoe, whereby, the vertical outer edges of the horseshoe assume an acute angle shown at 616, with respect to the vertical. The negative camber and the configuration of the stabilizer beads assist to improve the stability of the horse especially during racing, while negotiating curves on the track.

Those skilled in the art are aware that when a race horse runs on a race-track at 30-40 miles an hour, the entire hoof-impact duration can be of the order of milliseconds, and it is thus desirable to deliberately cause and assist a predetermined degree of splaying of the left and right branches of the horseshoe during the hoof-impact duration. Additionally, the horse on a race track needs stabilizing assistance while negotiating curves. The present invention aims at achieving the much desired stability and splaying action without complicated gadgetry in the horseshoe or without the use of any composite materials constituting the horseshoe.

It is further to be noted that where the sizing of the horseshoe or other significant installation-preparation may not be intrinsically necessary, the farrier would pick up a horseshoe which is illustrated in any of FIGS. 1a-1d and 2a-2d It is understood that with the embodiments illustrated in FIGS. 3a-3d and 4a-4d, installation-preparation by the farrier for the horseshoe might be desirable in order for the horseshoe to function as required herein, whereby splaying of the left and right branches is caused as desired.

In all the above embodiments, it is to be noted that deliberate mechanical splaying of the left and right branches is caused by the resilient action of the chord-like spring element or the resilient action of the leaf-spring, as the case may be. It is further to be noted that action of accommodating splaying per-se by the horseshoe is not the same as the action of causing the splaying. In the present invention, deliberate splaying is caused by the construction and function of the inventive horseshoe, and additionally, the present horseshoe construction also accommodates horse-induced splaying. Further, in any of the above embodiments, the generally U shaped body of the horseshoe could comprise a single piece which is obtained by any process chosen from forging, casting, blanking, welding, brazing or a combination of casting and forging. Other methods of obtaining the U shaped unitary body are within the purview of the invention. As aforesaid, in one embodiment, the horseshoe includes a chord-like leaf-spring member which causes the left and right branches of the horseshoe to resiliently splay as desired.

In all the embodiments and their modifications in the present inventions, the material for the horseshoe might comprise suitable metallic material chosen from titanium, spring steel alloy, or ferrous material such as a suitable grade of steel, or spring steel. The horseshoe might comprise a U shaped body obtained by a forging operation using precipitation hardened spring steel 17-4 PH.

Preferred embodiments described above selectively offer one or more of the following advantages:

1. The preferred embodiment of the inventive horseshoe as described is of unitary construction, not composite, and requires no assembly, and accordingly eliminates additional assembly costs, and includes a stabilizing feature at the underside of the horseshoe.
2. The preferred embodiment being of unitary-construction, may be mass produced by forging, casting, blanking or a combination thereof, the mass production serving to lower the manufacturing costs.
3. The inventive horseshoe is metallic, and lasts at least as long as other prior art metallic horseshoes.
4. The inventive horseshoes when offered in precipitation hardened spring steel 17-4 PH are rustproof and more desirable than prior art metallic ferrous based horseshoes.
5. The splaying action caused by the resilient action of the leaf-spring (or spring element) in all the embodiments is desirable, especially for race horses.
6. The stabilizing means/feature provided on the undersurface of the horseshoe as illustrated, serves to stabilize and enhance the ground-grip for the horse on curves of a track especially during racing.
7. The optional grooves provided selectively at either side of the central toe portion facilitate the bending of the left and right wings during sizing of the horseshoe by the farrier (farrier-preparation).
8. The stabilizer means could comprise two rows or three rows of bead-like formations integrally formed on the underside of the horseshoe. The rows of bead-like formations may be staggered and could be disposed to form a negative camber on the horseshoe underside.

In the foregoing detailed description of embodiments of the invention, various features may have been grouped together in a single exemplary embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should therefore be determined with reference to the appended claims, along with the full scope of equivalents to which such claims are entitled. In the appended claims, the terms "including" and "in which" where present, are used as the plain-English equivalents of the respective terms "comprising" and "wherein," respectively. Moreover, the terms "first," "second," and "third," etc., if used, are used merely as labels, and are not intended to impose numerical requirements on their objects.

The invention claimed is:

1. A horseshoe that when in use is capable of accommodating splaying of a horse hoof, said horseshoe comprising a generally U shaped monolithic single piece solid metal body including a heel-region and including left and right branches having metallic undersurfaces lying on a common bottom plane of the horseshoe, and a central toe area, said central toe area including a crescent shaped spring element that includes a convex outer edge and a concave inner edge, said spring element having resilience in a vertically upward direction that is perpendicular to said common bottom plane, said convex outer edge being substantially in said common bottom plane, said concave inner edge in use projecting below said common bottom plane by a projection-portion having a chosen design dimension, which upon the horseshoe in use impacting ground, gets resiliently pushed vertically upwards to deliberately and mechanically cause and allow said left and right branches of the horseshoe to splay, whereby, when said central toe area is not impacting the ground, said left and right branches of the horseshoe tend to be repetitively and resiliently restored to their original positions without splaying, said metal horseshoe additionally including stabilizer means comprising at least two parallel rows of bead-like metal projections integrally formed on each of said left and right branches on a bottom surface of the horseshoe to provide stability and additional road grip while the horseshoe is in use on a race track.

2. The horseshoe as in claim 1, wherein said concave inner edge has end portions that are substantially level with said common bottom plane and wherein said chosen design dimension of said projection-portion has a maximum point below said common bottom plane at substantially a central region of said concave inner edge.

3. The horseshoe as in claim 1, wherein said projection-portion becomes defined when a farrier prepares said horseshoe for installation, and wherein said crescent shaped spring element of said toe area forms a cavity with an underside of said horse hoof while the horseshoe is in use, which cavity is filled with a resilient compressible material to prevent accumulation of dirt and debris in said cavity.

4. The horseshoe as in claim 3 wherein said central toe area and left and right branches are all integral in a single piece, and said resilient compressible material comprises silicone, wherein the horseshoe is made of hardened spring steel 17-4 PH.

5. The horseshoe as in claim 1 wherein said central toe area is integral with said left and right branches and is provided with grooves on left and right sides of said central toe area, said grooves assisting in bending of the left and right branches during sizing of the horseshoe by a farrier during installation and wherein said parallel rows of bead-like metal projections comprise three rows of bead-like metal projections formed integrally with the horseshoe.

6. The horseshoe as in claim 5 wherein said central toe area is formed by an operation chosen from forging, casting, welding, brazing, a combination of casting and forging, and mechanical joining, and wherein said grooves each have a cross section chosen from the group consisting of semi-circular, semi-elliptical, arcuate and V shaped profiles.

7. The horseshoe as in claim 5 wherein said three parallel rows of bead-like metal projections are provided in regions extending from said central toe area and proceeding towards open ends of said U shaped body, wherein said bead-like metal projections in adjacent ones of said three parallel rows are staggered, wherein said bead-like metal projections have their bottom tips lying on a curved surface following a camber, wherein said central toe area includes an elongated recess adjacent said convex outer edge, and wherein the horseshoe comprises spring steel.

8. A horseshoe capable of causing and accommodating splaying of a horse hoof when the horseshoe is in use, said horseshoe comprising a generally U shaped single piece monolithic solid metal body and including left and right branches lying on a bottom plane of the horseshoe, and a central toe portion integrally bridging said left and right branches which are capable of resilient splaying, said central toe portion including a generally crescent shaped leaf-spring with a first unstressed state and a second stressed state, said crescent shaped leaf-spring having a convex edge and a concave edge, said concave edge having a projecting-portion with a chosen design dimension and projecting below said bottom plane in said first unstressed state, said generally crescent shaped leaf-spring attaining its said second stressed state by loading of the horseshoe when the horseshoe in use impacts the ground, said projecting-portion of the leaf-spring being resiliently pushed upwards to reach its said second stressed state to deliberately cause said left and right branches to splay, whereby said central toe portion continually and alternately goes through its said second stressed and said first unstressed states repetitively when the horse hoof in use impacts the ground and is off the ground, said metal horseshoe additionally including stabilizer means comprising a plurality of parallel rows of bead-like elements integrally formed on each of said branches on an undersurface of the horseshoe to provide stability and additional road grip while the horseshoe is in use on a race track.

9. The horseshoe as in claim 8 wherein said generally U shaped monolithic metal body comprises titanium.

10. The horseshoe as in claim 8 wherein said generally U shaped unitary metal body is obtained by at least one process chosen from processes of forging, casting, a combination of casting and forging, blanking, welding or brazing, said central toe portion being provided with grooves on left and right sides thereof to facilitate bending of said left and right branches during farrier-preparation of the horseshoe to prepare the horseshoe before installation.

11. The horseshoe as in claim 10 wherein said generally U shaped monolithic metal body comprises forged precipitation hardened spring steel 17-4 PH.

12. The horseshoe as in claim 10, wherein said bead-like elements provided on an undersurface of said left and right branches are in two parallel rows, and wherein said grooves each have a profile chosen from semi-circular, semi-elliptical, arcuate and V-shaped profiles.

13. The horseshoe as in claim 10, wherein said bead-like elements provided on an undersurface of said left and right branches are in three parallel rows, and wherein said grooves each have a profile chosen from semi-circular, semi-elliptical, arcuate and V-shaped profiles.

14. The horseshoe as in claim 10, wherein said projecting-portion has a maximum point below said common bottom plane at substantially a central region of said concave edge.

15. The horseshoe as in claim 14, wherein said central toe portion includes an arcuate elongated aperture substantially in a middle portion of said central toe portion, and wherein said crescent shaped leaf-spring in use forms a cavity with an undersurface of said horse hoof in an installed horseshoe, which cavity is filled with a resilient compressible material to obviate accumulation of dirt and debris in said cavity.

16. The horseshoe as in claim 15, wherein said left and right branches each include a plurality of nail-holes for driving nails in a direction substantially perpendicular to said bottom plane, and wherein said central toe portion includes apertures for inserting nails in a direction parallel to said bottom plane.

* * * * *